United States Patent [19]

Kikuchi

[11] Patent Number: 5,681,002
[45] Date of Patent: Oct. 28, 1997

[54] TAPE CARTRIDGE

[75] Inventor: Shuichi Kikuchi, Miyagi, Japan

[73] Assignee: Sony Corporation, Tokyo, Japan

[21] Appl. No.: 598,545

[22] Filed: Feb. 8, 1996

[30]     Foreign Application Priority Data

Feb. 14, 1995  [JP]  Japan ................................. 7-024883
Apr. 21, 1995  [JP]  Japan ................................. 7-096375

[51] Int. Cl.$^6$ ............................................... G11B 23/04
[52] U.S. Cl. ...................................... 242/347; 242/348
[58] Field of Search ................................ 242/347, 348;
360/132

[56]               References Cited

U.S. PATENT DOCUMENTS 4,358,071  11/1982  Okamura ........................... 242/347 X
5,180,118   1/1993  Tanaka et al. ....................... 242/347
5,522,562   6/1996  Stanley et al. .................... 242/347 X

*Primary Examiner*—John Q. Nguyen
*Attorney, Agent, or Firm*—William S. Frommer; Alvin Sinderbrand

[57]                ABSTRACT

In order to assure the assembly steps of a tape cartridge, a base plate of the cartridge has a rough surface. The rough surface is possessed by a plastic layer coated on the base plate. For producing the rough surface, fine particles and/or fibrous members are embedded in the plastic layer.

10 Claims, 5 Drawing Sheets

TAPE CARTRIDGE

BACKGROUND OF THE INVENTION

1. Field of the Invention

The present invention relates in general to cartridges for a recording tape or the like, and more particularly to the tape cartridges of a type including a base plate which has a tape supply hub, a tape take-up hub and tape guides arranged thereon, and a cover which is mounted on the base plate to cover the hubs and the guides.

2. Description of the Prior Art

In order to clarify the task of the present invention, some conventional tape cartridges of the above-mentioned type will be briefly described with reference to FIGS. 6 to 9 of the accompanying drawings.

In FIG. 6, one conventional tape cartridge 101 is shown, which is widely used as an external storage medium of a computer.

The cartridge 101 comprises generally a base plate 102 and a cover 103 which is mounted on the base plate 102.

On the base plate 102, there are arranged a tape supply hub 105 for supplying a recording tape 104 therefrom, a tape take-up hub 106 for taking up the tape 104, a pair of tape guides 107 and 108 for guiding movement of the tape 104, a drive roller 109, a pair of corner rollers 110 and 111, a drive belt 112 put around the drive roller 109 and the corner rollers 110 and 111 in a manner to provide a T-shaped traveling path, a reflecting mirror (prism) 113, a lid 115 for selectively opening and closing a head receiving aperture 114 formed in the cover 103 and a spring 116 for biasing the lid 115 in the closing direction. The base plate 102 is constructed of aluminum and treated with a so-called anodic oxide coating to form a protective surface on the aluminum base plate 102. With this protective surface, the hardness of the base plate 102 and the corrosion resistance of the same are increased. However, due to usage of the time-consuming and costly anodic oxide coating process, the production cost of the base plate 102 is very high.

For solving this drawback, a base plate 102 coated with a plastic protective layer 121 has been proposed, which is shown in FIG. 7. In fact, the base plate 102 of this type can be produced at relatively low cost. However, due to a very smoothed surface possessed by the plastic layer 121, this type base plate 103 has the following drawbacks, which appear in assembling process of the tape cartridge.

That is, as is seen from FIG. 8, in assembling process, the base plate 102 is put on a work table 131 and driven in a certain direction by a driving roller 132 which is pressed against the base plate 102. However, the excessive smoothness of the surface of the base plate 102 tends to produce a slipping rotation of the roller 132, which induces unstable movement of the base plate 102 on the work table 131. This unstable movement of the base plate 102 becomes much severe when the work table 131 has also a very smoothed surface. In fact, in this case, the base plate 102 sticks fast to the work table 131 and thus the base plate 102 does not move any longer irrespective of rotation of the driving roller 132.

Furthermore, as is seen from FIG. 9, if fine hard foreign things 133, such as, grains of sand or the like happen to be led between the work table 131 and the base plate 102, the lower smoothed surface of the base plate 102 is forced to produce unsightly scratches. Such scratches deteriorates the external appearance of the tape cartridge.

SUMMARY OF THE INVENTION

It is therefore an object of the present invention to provide a tape cartridge having a base plate which is free of the above-mentioned drawbacks.

According to the present invention, there is provided a tape cartridge having a base plate which is coated with a plastic protective layer whose surface is rough.

According to the present invention, there is provided a tape cartridge which comprises a base plate having a plastic layer coated thereon, and means for providing the plastic layer with a rough outer surface.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
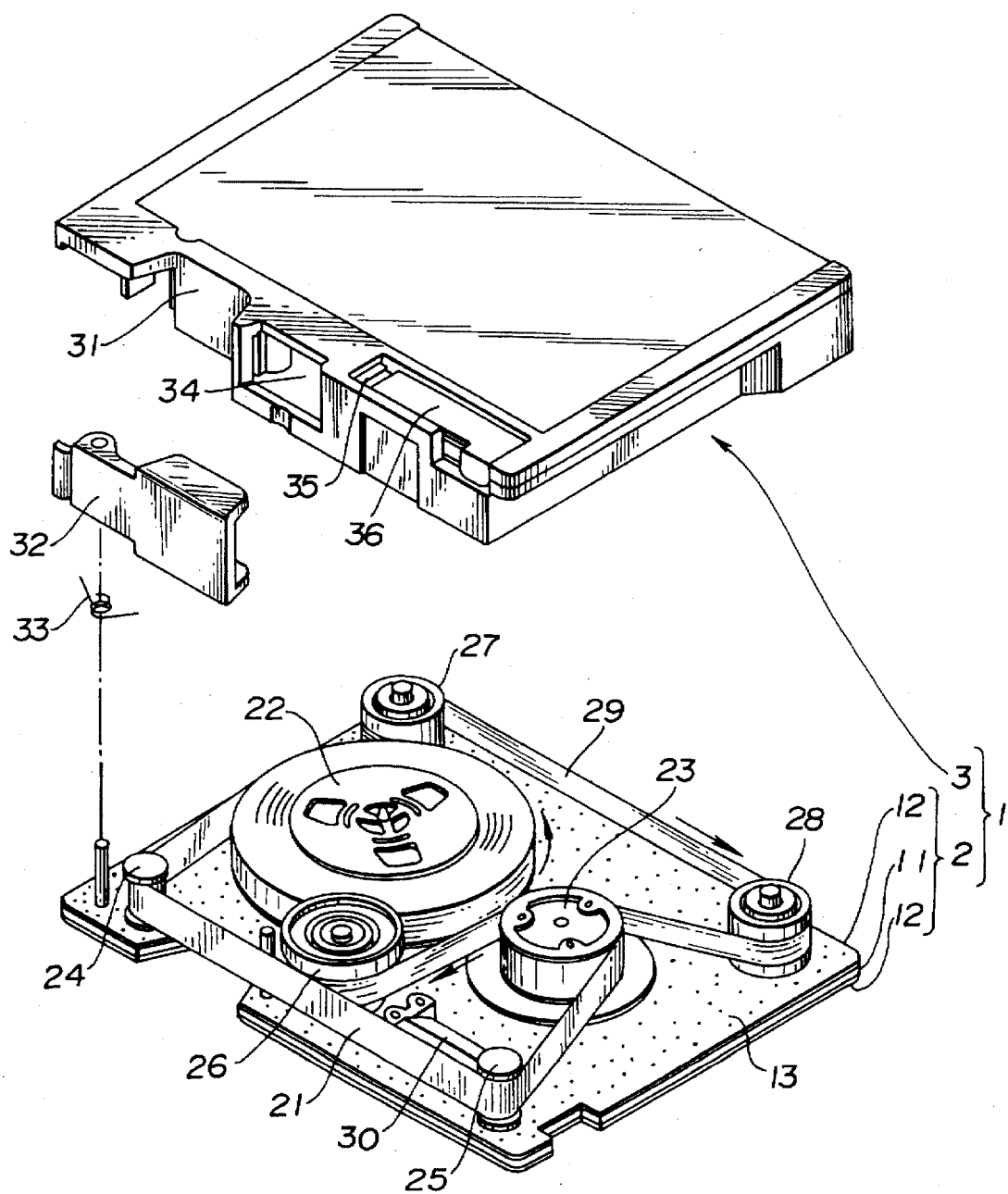
FIG. 1 is an exploded view of a tape cartridge according to the present invention.

Referring to FIGS. 1 to 5, particularly FIG. 1 of the accompanying drawings, there is shown a tape cartridge 1 of the present invention, which can be used as an external storage medium of a computer. More specifically, the tape cartridge 1 can be served as ¼ inch data cartridge.

The tape cartridge 1 generally comprises a base plate 2 and a transparent plastic cover 3 which is mounted on the base plate 2.

On the base plate 2, there are arranged a tape supply hub 22 for supplying a recording tape 21 therefrom, a tape take-up hub 23 for taking up the tape 21, a pair of tape guides 24 and 25 for guiding movement of the tape 21, a drive roller 26, a pair of corner rollers 27 and 28, a drive belt 29 put around the drive roller 26 and the corner rollers 27 and 28 in a manner to provide a T-shaped traveling path, a reflecting mirror 30, a lid 32 for selectively opening and closing a head receiving aperture 31 formed in the cover 3 and a spring 33 for biasing the lid 32 in the closing direction.

The drive belt 29 extending between the drive roller 26 and one corner roller 27 is frictionally pressed against the recording tape 21 wound on the tape supply hub 22, while the drive belt 29 extending between the drive roller 26 and the other corner roller 28 is frictionally pressed against the recording tape 21 wound around the tape take-up hub 23. Thus, when, due to operation of the drive roller 26, the drive belt 29 is moved in the direction of the arrows, the tape take-up hub 23 is rotated in a tape take-up direction and the tape supply hub 22 is rotated in a tape supplying direction.

The transparent plastic cover 3 is bolted to the base plate 2 to cover the parts 21, 22, 23, 24, 24, 25, 26, 27, 28, 29 and 30 on the base plate 2.

As is seen from FIG. 1, the head receiving aperture 31 is formed at a front left portion of the cover 3. At a front center portion of the cover 3, there is formed an opening 34 through which a part of the drive roller 26 is exposed to the outside. At a front right portion of the cover, there is provided a rectangular recess 35 in which a locking/unlocking tab (or write inhibiting tab) 36 is slidably received.

Similar to the above-mentioned conventional tape cartridge 101, the base plate 2 is constructed of an aluminum plate 11 and coated with a plastic protective layer 12. That is, as is seen from FIG. 2, upper and lower surfaces of the aluminum plate 11 are both coated with a plastic layer 12.

However, in the present invention, the following measure is employed in the base plate 2.

That is, the plastic layer 12 is constructed to have a rough surface 13. As will become apparent as the description proceeds, the rough surface 13 is produced by fine particles 14 embedded in the plastic layer 12.

The material of the plastic layer 12 is epoxy resin, acrylic resin, urethane resin, fluororesin or the like.

The fine particles 14 are of inorganic or organic material, and each particle 14 is about 3 to 150 μm in diameter.

For preparation of a coating material which is to be coated on the aluminum plate 11, about 10 to 100 parts by weight of the fine particles 14 are added to a liquefied plastic material.

As the inorganic materials, aluminum oxide, kaolin, calcium silicate, calcium carbonate, titanium oxide, zinc oxide and the like are usable, and as the organic materials, polymeric urethane, Nylon (trade name), acrylate resin and the like are usable.

Experiments have revealed that if the diameter of the particles 14 is smaller than 3 μm, the surface of the plastic layer 12 becomes too smoothed, while, if the diameter is greater than 150 μm, the roughness of the surface becomes too large, that is, the surface is unsightly rugged. Furthermore, experiments have revealed that if the amount of the fine particles 14 in the liquefied plastic material exceeds 130 parts by weight, the bonding effect of the plastic layer 12 to the aluminum plate 11 becomes poor causing easy separation of the plastic layer 12 from the plate 11, while, if the amount of the particles 14 is less than 3 parts by weight, both the abrasion resistance and friction resistance of the plastic layer 12 become poor. Thus, it is preferable that the fine particles 14 have a diameter of about 3 to 150 μm and the coating material contains about 10 to 100 parts by weight of the fine particles 14.

In order to provide the aluminum plate 11 with the plastic layer 12 having rough surface 13, the following steps are carried out.

Figure 2:
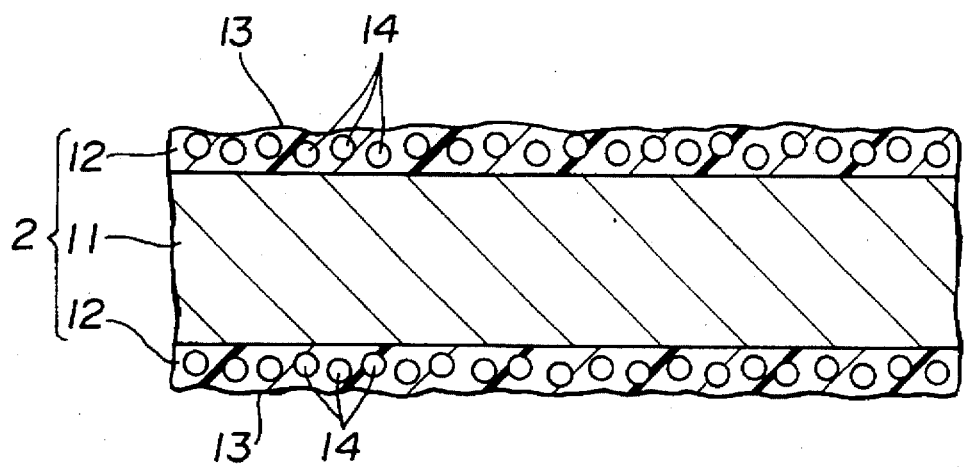
FIG. 2 is an enlarged sectional view of a base plate employed as an essential element of the tape cartridge of the present invention.

First, a liquefied plastic material is prepared, and then a given amount of fine particles 14 is added to and sufficiently mixed with the liquefied plastic material. With this, a coating material is prepared. Then, the coating material is applied to or coated on an aluminum plate 11. With this, a non-cured plastic layer 12 is provided on the aluminum plate 11. Then, the aluminum plate 11 is led into an oven for curing the plastic layer 12. With these steps, there is produced the aluminum plate 11 having a hardened plastic layer 12 coated thereon, which has a rough surface 13 as is shown in FIG. 2. That is, a base plate 2 having a rough surface 13 is produced.

Due to provision of the rough surface 13, the base plate 2 has the following advantages.

Figure 3:
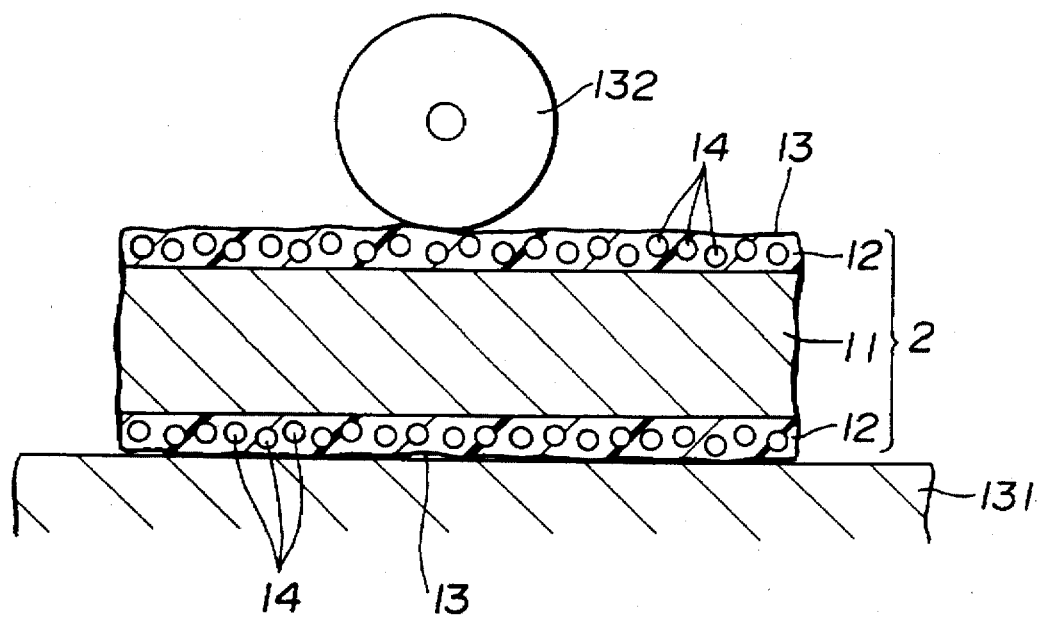
FIG. 3 is a view similar to FIG. 2, but showing a condition wherein the base plate on a work table is driven by a driving roller.

As is understood from FIG. 3, when, in assembling process, the base plate 2 is put on the work table 131, there are produced a plurality of air gaps between the work table 131 and the base plate 2 due to provision of the rough surface 13, which prevents the undesired fast-sticking of the base plate 2 to the work table 131. Thus, the base plate 2 is easily moved in a desired direction when forced by the driving roller 132. Furthermore, due to the rough surface, the undesired slipping rotation of the driving roller 132 is suppressed, which assures the driving operation of the driving roller 132 relative to the base plate 2.

Figure 4:
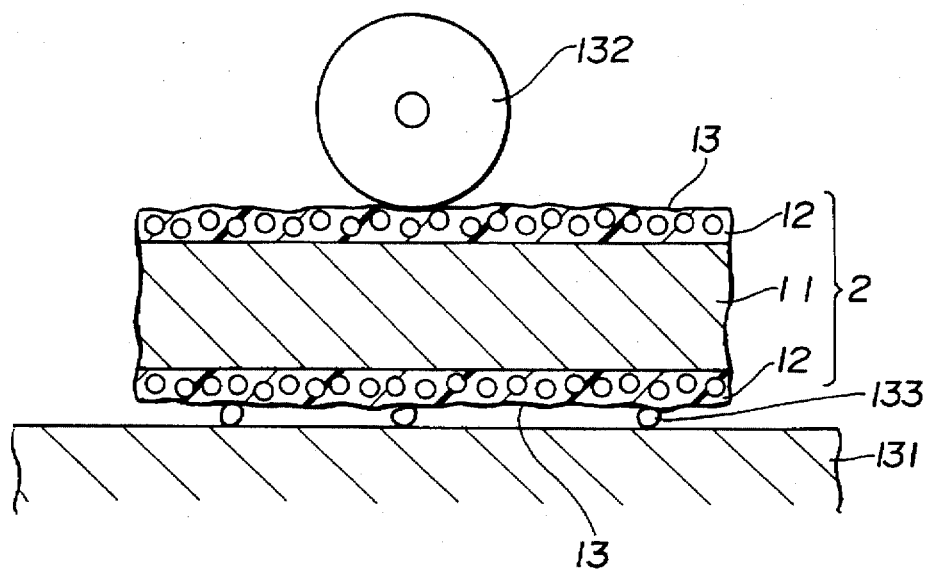
FIG. 4 is a view similar to FIG. 3, but showing a condition wherein fine hard foreign things are put between the work table and the base plate.

As is seen from FIG. 4, if the base plate 2 is driven in a certain direction with fine hard foreign things 133 put between the work table 131 and the base plate 2, the rough surface 13 functions to take the foreign things 133 in the same direction. That is, during the movement of the base plate 2, the foreign things 133 are kept caught by fine depressions defined by the rough surface 13 and thus moved together with base plate 2. Thus, production of scratches on the rough surface 13 is suppressed or at least minimized.

Figure 5:
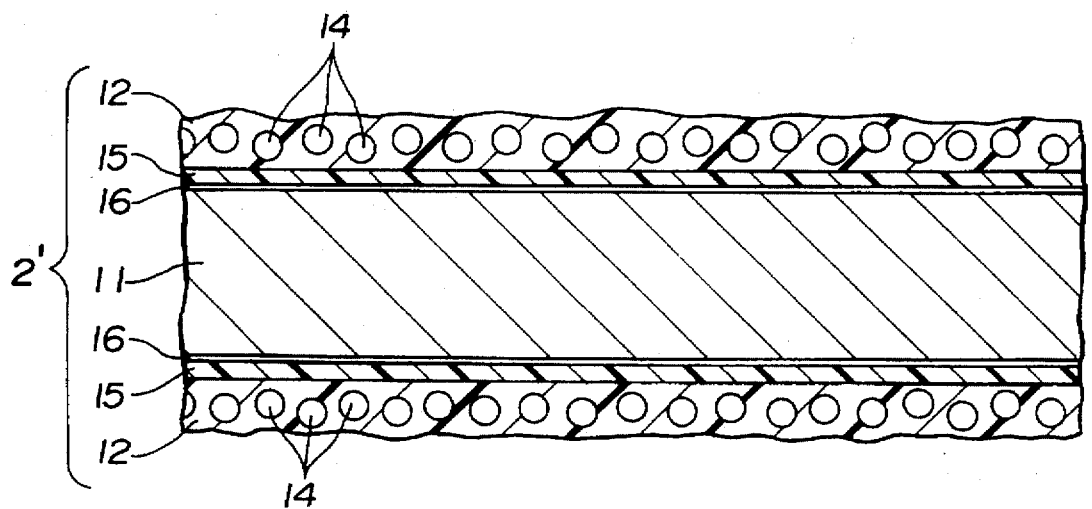
FIG. 5 is a view similar to FIG. 2, but showing a modification of the base plate.
Figure 6:
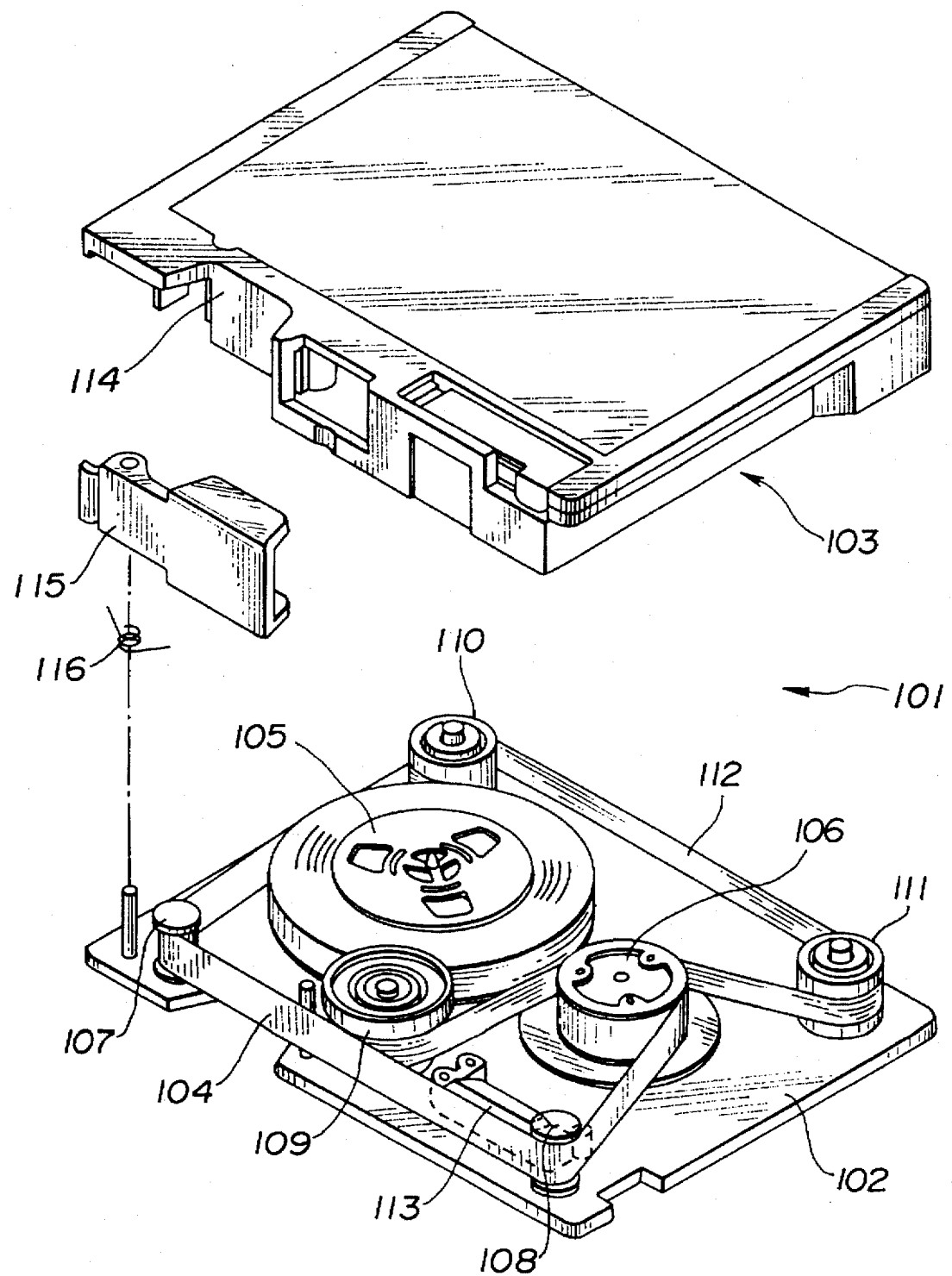
FIG. 6 is an exploded view of a conventional tape cartridge.
Figure 7:
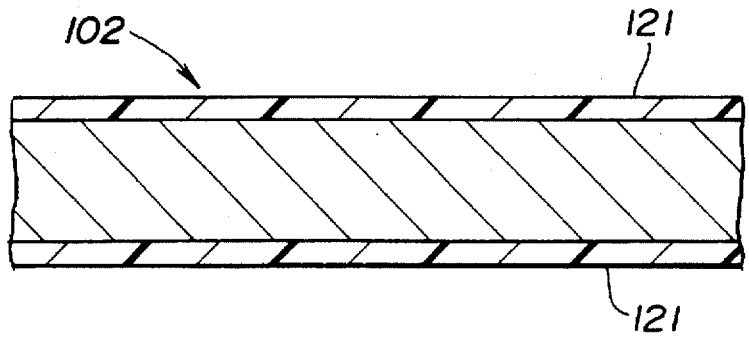
FIG. 7 is an enlarged sectional view of a base plate employed as an element of the conventional tape cartridge.
Figure 8:
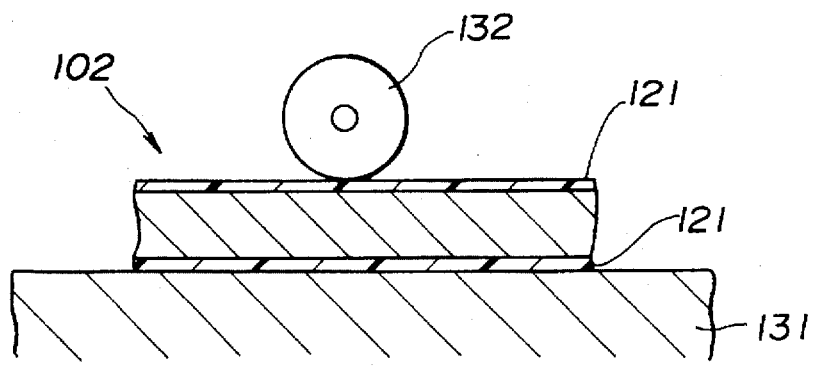
FIG. 8 is a view similar to FIG. 7, but showing a condition wherein the base plate on a work table is driven by a driving roller.
Figure 9:
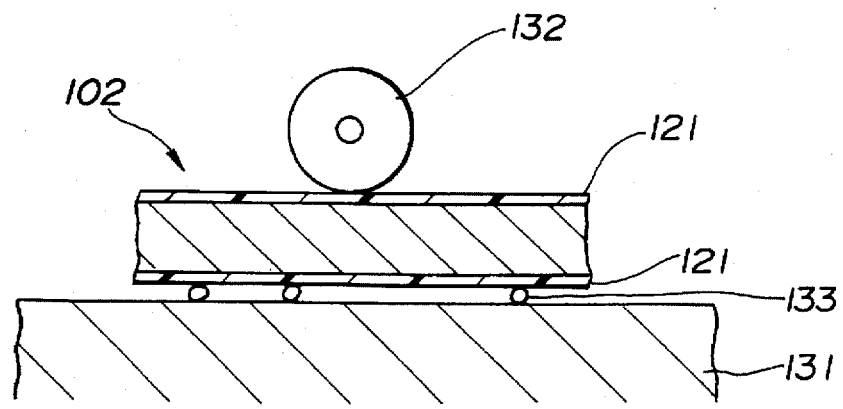
FIG. 9 is a view similar to FIG. 8, but showing a condition wherein fine hard foreign things are put between the work table and the base plate.

Referring to FIG. 5, there is shown a modification of the base plate 2, which is generally designated by numeral 2'.

This modification 2' is aimed to provide a much stronger bonding between the plastic layer 12 and the aluminum plate 11. In fact, when the layer 12 contains more than 10 parts by weight of larger (viz., about 50 to 150 μm) diameter particles 14, the bonding effect of the plastic layer 12 to the aluminum plate 11 is remarkably reduced.

Thus, in the modification 2', there is employed an intermediate layer 15 of plastic between the aluminum plate 11 and the outer plastic layer 12, as a bonding reinforcing means. The intermediate layer 15 is of a plastic, such as polyester resin or the like, which exhibits an excellent bonding effect to the aluminum plate 11.

For producing the modification 2', the following steps are carried out.

First, the aluminum plate 11 is treated with phosphoric acid to provide a rough surface 16, and then a liquefied material of polyester resin is applied to or coated on the rough surface 16. After the coated polyester resin is cured to a certain degree, a coating material, which will be described hereinnext, is applied to or coated on the intermediate layer 15. With this, a non-cured plastic layer 12 is provided on the intermediate layer 15.

For producing the coating material, 75 parts by weight of polyester resin and 25 parts by weight of melamine resin are mixed and 12% by weight of talc is added to the mixture. Then, 10 parts by weight of fine particles 14 having diameter of 50 to 150 μm are added to the mixture.

The aluminum plate 11 thus coated with the non-cured plastic layer 12 is led into an oven for sufficiently curing both the outer layer 12 and the intermediate layer 15. With these steps, there is produced the modification of FIG. 5.

If desired, fibrous material may be used in place of the fine particles 14 for providing the plastic layer 12 with a rough surface 13.

The fibrous material is of inorganic or organic material, and is larger than 3 μm in diameter and shorter than 150 μm in length. Experiments have revealed that if the diameter is smaller than 3 μm, desired mixing of the fibrous material with the coating material is not achieved, and if the length is longer than 150 μm, smoothed coating of the coating material to the aluminum plate 11 or the intermediate layer 15 is not achieved.

As the inorganic fibrous material, glass fiber, carbon fiber or the like is usable, and as the organic fibrous material, PET (polyethylene terephthalate) fiber, Nylon (trade name) fiber or the like is usable.

The following Examples are given for the purpose of further explaining the invention. It is not intended that the present invention be limited to the description within the Examples but is defined in the appended Claims.

EXAMPLE-1

For producing a coating mixture, 15 parts by weight of urethane particles (mean diameter: 15 μm) were added to a urethane resin solution. By using a roller type coater, the coating mixture was applied to or coated on an aluminum plate to provide thereon a plastic layer of about 5 μm thickness. Thereafter, the aluminum plate was heated at 180° C. for 15 minutes for curing the plastic layer.

The resultant plastic layer on the aluminum plate showed about 4H in pencil hardness and about 6 μm in roughness. Even when respective plastic layers of two aluminum plates were rubbed with each other, there were produced no scratches on each of the plastic layers.

EXAMPLE-2

For producing a coating mixture, 10 parts by weight of aluminum oxide particles (mean diameter: 6 μm) were added to a polyester-melamine resin solution (polyester resin: melamine resin=3:2). By using a roller type coater, the coating mixture was applied to or coated on an aluminum plate to provide thereon a plastic layer of about 6 μm thickness. Thereafter, the aluminum plate was heated at 200° C. for 10 minutes for curing the plastic layer.

The resultant plastic layer on the aluminum plate showed about 4H in pencil strength and about 4 μm in roughness. Even when respective plastic layers of two aluminum plates were rubbed with each other, no scratches were produced on each of the plastic layers.

EXAMPLE-3

In place of the aluminum plate, a fiber reinforced plastic (FRP) plate was prepared. The FRP plate was a polycarbonate resin impregnated with 15% by weight of glass fiber. For producing a coating mixture, 15 parts by weight of urethane particles (mean diameter: 15 μm) were added to a urethane resin solution. By using a roller type coater, the coating mixture was applied to or coated on the FRP plate to provide thereon a plastic layer of about 5 μm thickness. Thereafter, the FRP plate was heated at 130° C. for 60 minutes for curing the plastic layer.

The resultant plastic layer on the FRP plate showed about 4H in pencil hardness and 4 μm in roughness. Even when the FRP plate was subjected to a 500-times abrasion test, no abrasion chips of the plastic layer were found. When, for comparison, a FRP plate having no plastic layer coated thereon was also subjected to such abrasion test, abrasion chips of the plate were found at the time of about 100 test-times.

If desired, the following modifications may be employed in the present invention.

That is, the plastic layer 12 may be provided on only one of the upper and lower surfaces of the aluminum plate 11.

The plastic layer 12 may be colored. In this case, the types of the tape cartridges can be easily recognized by users.

What is claimed is:

1. A tape cassette comprising:

a base plate having a metal plate with substantially flat upper and lower plastic layers coated thereon, and means for providing said plastic layers with a rough outer surface wherein said means comprises fine particles embedded in said plastic layers with each particle being about 3 to 150 μm in diameter, and with said fine particles constituting about 10 to 100 parts by weight of said plastic layers.

2. A tape cartridge as claimed in claim 1, in which said means comprises fine particles or fibrous members embedded in said plastic layer, and in which said plastic layer is colored.

3. A tape cartridge as claimed in claim 1, in which said fine particles are of inorganic material, each inorganic particle being about 3 to 150 μm in diameter.

4. A tape cartridge as claimed in claim 3, in which for preparing a coating material which is to be coated on said base plate for producing said plastic layer, said about 10 to 100 parts by weight of the fine particles are added to a liquefied plastic material.

5. A tape cartridge as claimed in claim 1, further comprising an intermediate plastic layer which is interposed between said base plate and each said plastic layer to strengthen a bonding therebetween.

6. A tape cartridge as claimed in claim 1, in which for preparing a coating material which is to be coated on said base plate for producing said plastic layer, said about 10 to 100 parts by weight of the fine particles are added to a liquefied plastic material.

7. A tape cassette comprising:

a base plate having a metal plate with substantially flat upper and lower plastic layers coated thereon, and means for providing said plastic layers with a rough outer surface wherein said means comprises fibrous materials embedded in said plastic layers with each fibrous material being about 3 to 150 μm in diameter, and with said fibrous materials constituting about 10 to 100 parts by weight of said plastic layers.

8. A tape cartridge as claimed in claim 7, in which said fibrous members are of inorganic material, each inorganic fibrous member being larger than 3 μm in diameter and shorter than 150 μm in length.

9. A tape cartridge as claimed in claim 8, in which for preparing a coating material which is to be coated on said base plate for producing said plastic layer, said about 10 to 100 parts by weight of the inorganic fibrous members are added to a liquefied plastic material.

10. A tape cartridge as claimed in claim 7, in which for preparing a coating material which is to be coated on said base plate for producing said plastic layer, said about 10 to 100 parts by weight of the organic members are added to a liquefied plastic material.

* * * * *